United States Patent [19]
Badesha et al.

[11] Patent Number: 4,645,619
[45] Date of Patent: * Feb. 24, 1987

[54] PROCESS FOR THE PREPARATION OF COLLOIDAL DISPERSIONS OF CHALCOGENS AND CHALCOGENIDE ALLOYS

[75] Inventors: Santokh S. Badesha, Pittsford; Thomas W. Smith, Penfield, both of N.Y.

[73] Assignee: Xerox Corporation, Stamford, Conn.

[*] Notice: The portion of the term of this patent subsequent to Jul. 17, 2001 has been disclaimed.

[21] Appl. No.: 737,971

[22] Filed: May 28, 1985

[51] Int. Cl.$^4$ .................. B01J 13/00; G03G 15/08
[52] U.S. Cl. ................................ 252/314; 252/309; 430/86
[58] Field of Search .............. 252/309, 313.1, 314; 430/86

[56] References Cited

U.S. PATENT DOCUMENTS

| | | | |
|---|---|---|---|
| 3,954,951 | 5/1976 | Buckley | 423/510 |
| 4,007,255 | 2/1977 | Buckley | 423/510 |
| 4,009,249 | 2/1977 | Buckley | 423/510 |
| 4,115,115 | 9/1978 | Marsh | 96/1.5 R |
| 4,121,981 | 10/1978 | Ward et al. | 430/85 X |
| 4,122,030 | 10/1978 | Smith et al. | 252/309 X |
| 4,265,990 | 5/1981 | Stolka et al. | 430/59 |
| 4,286,040 | 8/1981 | van Lomm | 430/127 |
| 4,389,389 | 6/1983 | Badesha | 423/510 |
| 4,411,698 | 10/1983 | Badesha | 75/121 |
| 4,421,838 | 12/1983 | Takeda et al. | 430/58 |
| 4,460,408 | 7/1984 | Badesha et al. | 75/0.5 R |
| 4,484,945 | 11/1984 | Badesha et al. | 750/0.5 A |
| 4,548,800 | 10/1985 | Badesha et al. | 423/510 |

Primary Examiner—Richard D. Lovering
Attorney, Agent, or Firm—E. O. Palazzo

[57] ABSTRACT

Disclosed is an improved process for the preparation of a stable colloidal dispersion of a selenium tellurium alloy, which comprises providing a solution with a polymer therein; adding to the solution a selenium ester and a tellurium ester; and subsequently subjecting the resulting mixture to a reduction reaction by adding thereto a reducing agent whereby there is generated selenium tellurium particles of a diameter of from about 0.01 micron to about 0.3 micron in solution.

9 Claims, No Drawings

PROCESS FOR THE PREPARATION OF COLLOIDAL DISPERSIONS OF CHALCOGENS AND CHALCOGENIDE ALLOYS

BACKGROUND OF THE INVENTION

This invention is generally directed to processes for the preparation of colloidal dispersions of chalcogenide alloys, and more specifically the present invention is directed to improved processes for preparing dispersions of selenium, tellurium, and their alloys. One general embodiment of the present invention is directed to improved processes for the preparation of selenium, tellurium, and selenium tellurium alloys by adding a source composition with the aforementioned substances therein to a solution comprised of a polymeric material dissolved in an organic solvent, and subsequently subjecting this solution to a reduction reaction. Compositions prepared in accordance with the process of the present invention are useful for a number of purposes, including for example as photoconductive substances in xerographic imaging processes. Accordingly, the colloidal dispersions of selenium tellurium alloys prepared in accordance with the process of the present invention can function as photogenerating pigments in layered imaging members, inclusive of those described in U.S. Pat. No. 4,265,990, the disclosure of which is totally incorporated herein by reference.

Processes for the preparation of selenium and selenium alloys in high purity, 99.999 percent or greater, thus enabling their selection for incorporation into xerographic imaging members are known. These processes, however, involve a number of chemical and physical processing steps, and additionally require high temperature distillations. Accordingly, therefore, many of the prior art processes for preparing selenium, or selenium tellurium alloys of high purity are complex; and in many instances economically unattractive. Specifically, the chemical and physical prior art processes can result in the formation of hazardous volatile oxides during the high temperature distillation sequence. Furthermore, the aforementioned prior art processes can generate selenium, or selenium alloy products of different electrical properties despite adherence to the same process conditions.

One present specific common commercial method selected for the preparation of high purity selenium, or the corresponding alloys thereof, encompasses the formation of selenious acid, $H_2SeO_3$, from crude selenium, followed by purification, and a complicated and repeated ion-exchange process. The selenium precipitate is then further purified, melted, and subjected to distillation at relatively high temperatures of from about 600° C. to 700° C., followed by vacuum distillation. This distillation necessitates very complex and costly equipment; and further, any pollution products resulting such as vaporous oxides and mercury must be safely eliminated.

There is disclosed in U.S. Pat. Nos. 4,007,255 and 4,009,249 the preparation of stable red amorphous selenium containing thallium, and the preparation of red amorphous selenium. In the U.S. Pat. No. 4,007,225 there is illustrated a process for generating an amorphous red selenium with thallium, which comprises precipitating selenious acid containing from about 10 parts per million to about 10,000 parts per million of thallium dioxide with hydrazine from a solution thereof in methanol or ethanol containing not more than about 50 percent by weight of water at a temperature between about −20° C. and the freezing point of the solution; and maintaining the resulting precipitate at a temperature of about −13° C. to about −3° C. until the solution turns to a red color. The U.S. Pat. No. 4.009,249 presents a similar disclosure with the exception that the thallium is not contained in the material being treated.

Additionally, a number of other processes for the preparation of selenium and selenium alloys are known. Thus, for example, there is disclosed in U.S. Pat. No. 4,121,981 an electrochemical method for obtaining a photoreceptor comprised of a selenium tellurium layer. More specifically, there is described in this patent the formation of a photogenerating layer by electrochemically codepositing selenium and tellurium onto a substrate from a solution of their ions in such a manner that the relative amounts of selenium and tellurium which are deposited are controlled by their relative concentrations in the electrolyte, and by the choice of electrochemical conditions.

Moreover, there is disclosed in copending applications improved processes for affecting the preparation of selenium, and selenium alloys in high purity which overcomes many of the prior art disadvantages. These processes comprise the formation, isolation and purification of chalcogenide esters, followed by the reduction of these esters to obtain the compositions desired. There is thus described, for example, in U.S. Ser. No. 404,259, U.S. Pat. No. 4,548,800, the disclosure of which is totally incorporated herein by reference, a process for the preparation of selenium of high purity which comprises reacting selenious acid, selenium oxides, or mixtures thereof with an alcohol, followed by subjecting the resulting isolated selenium ester to a reduction reaction. In one variation of the process described in the copending application, the selenious acid, selenium oxides, or mixtures thereof are prepared by the reaction of crude selenium with a strong acid, such as nitric acid, sulfuric acid or mixtures thereof. This process is economically attractive since high temperature distillations and costly equipment are not required, and most of the processing materials can be recycled.

Furthermore, there is disclosed in U.S. Pat. No. 4,122,030 a method for the preparation of stable dispersions of selenium wherein there is provided a solution of a solvent containing submicron domains of a soluble second phase with a plurality of pendent groups capable of reducing selenious acid to selenium, followed by adding selenious acid or an alkyl selenite to the solution to reduce the selenium in the selenious acid or alkyl selenite to zero valent selenium, thereby resulting in the formation of a stable colloidal dispersion of selenium, reference the disclosure in column 2, beginning at line 5. Disadvantages associated with the process described in the U.S. Pat. No. 4,122,030 include the necessity of forming submicron domains capable of binding the reducing agents therein, and further the domains that are regenerated on completion of the reaction remain in the dispersions. As these domains are charged species, they have a tendency to trap carriers or positive charges, which is undesirable, when imaging members comprised of these compositions are selected for incorporation into layered photoresponsive devices. Moreover, selenium prepared in accordance with the process of this patent is red in color, that is, it is amorphous, while with the process of the present invention these are prepared crystalline selenium tellurium substances which are highly useful for incorporation into layered photoresponsive imaging members.

While the above processes are suitable for their intended purposes, there remains a need for improved processes for the preparation of certain chalcogens and chalcogenide alloys. Also, there remains a need for improved simple low temperature chemical processes for preparing selenium, tellurium, and selenium alloys in high purity, wherein the desired particles are generated in solution; and subsequently the solution is coated on a suitable substrate thereby resulting in the formation of a photoconductive member. There also continues to be a need for improved processes for obtaining chalcogenide particles in a polymeric solution. Additionally, there continues to be a need for improved processes for preparing selenium tellurium alloys in high yields, which eliminate environmental hazards associated with the formation and removal of harmful materials. Moreover, there continues to be a need for processes wherein photoconductive selenium tellurium substances are directly obtained from a polymer/solvent mixture.

SUMMARY OF THE INVENTION

It is an object of the present invention to provide improved processes for the preparation of selenium, tellurium and alloys thereof which overcome some of the above-noted disadvantages.

It is yet another object of the present invention to provide improved processes for the preparation of colloidal dispersions of selenium tellurium alloys in a desired polymer solvent medium.

A further object of the present invention resides in the provision of improved processes for the preparation of dispersions of selenium tellurium alloys in desired polymer compositions with chalcogenide esters as a reactant source material.

These and other objects of the present invention are accomplished by providing an improved process for the preparation of colloidal dispersions of chalcogens and chalcogenide alloys in high purity. More specifically, the present invention is directed to an improved process for preparing selenium tellurium alloys by providing a solution of a polymeric substance therein; adding a source of selenium tellurium thereto; and subsequently adding a dilute solution of reducing agent thereby resulting, for example, in a stable dispersion mixture of selenium tellurium particles in close proximity to the polymer composition. Thereafter, the solution can be directly selected for the incorporation of a selenium tellurium alloy into a photoconductive imaging member by coating the dispersion mixture on a suitable substrate.

Thus, in accordance with a specific process embodiment of the present invention there are prepared colloidal dispersions of selenium tellurium alloys in a suitable polymeric solvent solution mixture by initially preparing a solution of the polymer and the corresponding selenium tellurium ester, followed by subsequently subjecting the solution to a reduction or coreduction reaction.

In one specific illustrative embodiment of the present invention, the process is accomplished by providing a solution of the desired polymer in an appropriate solvent. Thereafter, a chalcogen or chalcogenide ester is added to the solution mixture with continuous stirring, and subsequently a reducing agent is admixed therein. There results chalcogenide or chalcogen colloidal particle dispersions, such as selenium tellurium when the source material is a selenium tellurium ester, which dispersions can be coated directly on suitable materials when fabricating xerographic photoconductive imaging members.

Generally, the polymer is dissolved in an organic solvent in an amount of from about 1 part by weight to about 40 parts by weight, and preferably in an amount of from about 5 parts by weight to about 20 parts by weight. Dissolution is usually accomplished at room temperature with extensive stirring, however, heating to a temperature of below 50° C. will assist in facilitating this aspect of the process.

Thereafter, in a specific process embodiment of the present invention there is added to the solution a source of a selenium tellurium alloy, reference for example the selenium tellurium ester as prepared in U.S. Pat. No. 4,460,408, the disclosure of which is totally incorporated herein by reference. Other suitable sources of chalcogenide materials that can be added to the polymeric solution include the esters and oxides of Group V and Group VI of the elements of the periodic table, like the selenium, tellurium, and arsenic esters, and the corresponding oxides. These substances are added to the solution in an effective amount so as to enable colloidal dispersions. Generally, however, the source component is added in amounts of from about 1 percent to about 30 percent, and preferably from about 5 percent to about 20 percent by weight.

To the solution comprised of a polymer dissolved therein, and a source of a selenium tellurium alloy, there is added a reducing component permitting the generation of selenium tellurium alloy particles therein. More specifically, the reduction reaction is accomplished as described in the copending application and the U.S. Pat. No. 4,460,408 identified herein. This reduction reaction can be accomplished at various suitable temperatures dependent on, for example, the reducing agent and the solvent selected. Generally, the reduction reaction is accomplished at relatively low temperatures, not exceeding about 120° C.; however, heating from about 25° C. to about 100° C. is effective.

The amount of reducing agent needed is dependent on a number of factors including the amount of selenium tellurium source esters present. Thus, for example, hydrazine is usually added in an equimolar quantity until completion of the reduction reaction while sulfur dioxide is bubbled through the solution in water for a period of time sufficient to cause the reduction reaction to be completed. Generally, the bubbling of sulfur dioxide is continued for a period of from about 2 hours to about 3 hours, although other times can be selected providing the objectives of the present invention are achieved.

The process of the present invention thus permits the formation of colloidal dispersions of selenium tellurium alloys with high concentrations of metallic elements. Thus, for example, the solution typically contains from about 5 percent to about 25 percent of a selenium tellurium alloy with a particle diameter of from about 0.01 microns to about 0.3 microns. The aforementioned high alloy concentration enables these solutions to be useful for the preparation of photoconductive devices. Specifically, for example, the solution can be simply coated on a suitable substrate by known techniques thereby resulting in deposition of the selenium tellurium alloys thereon, and wherein a photoconductive device is obtained.

Illustrative examples of polymeric substances selected for the process of the present invention, and enabling the formation of colloidal dispersions as described herein, include numerous known resins such as vinyl resins, phenoxy resins, epoxy resins, polycarbonates, polyurethanes, polyhydroxyether resins, and the like.

As examples of solvents that may be selected for the dissolution process, any substances which cause the polymer to completely or substantially dissolve therein will be suitable. Examples of specific solvents include organic solvents such as Cellosolve ®, benzene, toluene, aliphatic alcohols, ethanol, methanol and the like, with the solvents Cellosolve ® and methanol being preferred. Any effective amount of solvent can be selected, however, generally from about 50 milliliters to about 200 milliliters of solvent to about 5 parts per weight to about 20 parts per weight of polymer are selected.

Examples of reducing agents that may be selected include those well known in the art such as sulfur dioxide, hydrazine, ureas, thioureas, hydroxylamine, glyoxal, phosphites, pyrroles, ascorbic acid, and the like, with hydrazine being preferred.

With further specific regard to the process of the present invention, a solution of the polymer in appropriate solvent is initially prepared with stirring and slight heating to a temperature of from about 30° C. to 60° C., for a period of from about 0.5 hour to about 5 hours. Thereafter, there is added to the polymer solution a selenium and tellurium ester, followed by stirring to ensure complete mixing. Subsequently, a solution of the reducing agent in the same solvent as the polymer is added very slowly, for example, over a period of from about 10 minutes to about 1 hour, while stirring the contents of the reaction mixture. On completion of the addition, a stable colloidal selenium tellurium alloy polymer dispersion results. Further stirring will permit the formation of a selenium alloy tellurium polymeric colloidal dispersion with particles of a diameter of from about 0.01 micron to about 3.0 microns as measured by transmission electromicroscopy (TEM).

The dispersions prepared in accordance with the process of the present invention can be conveniently and economically selected for the preparation of photoconductive substances useful in layered imaging devices including those disclosed in U.S. Pat. No. 4,265,990, the disclosure of which is totally incorporated herein by reference. The photogenerating pigments useful in the devices of the U.S. Pat. No. 4,265,990 can be obtained from the solution mixture prepared in accordance with the process of the present invention.

Specifically thus, the dispersions prepared in accordance with the process of the present invention can be formulated into imaging members by, for example, coating the colloidal selenium tellurium alloy dispersions on a suitable conductive substrate such as aluminum. The resulting imaging or photoconductive member can then be incorporated into a suitable xerographic imaging apparatus. Furthermore, the dispersions prepared in accordance with the process of the present invention can be utilized in layered photoresponsive devices as the generating layer. These devices usually consist of a conductive substrate, a generating layer, and a transport layer, reference the previously mentioned U.S. Pat. No. 4,265,990. In these layered devices particles with diameters of 0.1 micron to 0.5 micron are desirable since this enables the resulting photoreceptor to be electrically stable for a substantial number of imaging cycles.

Although it is not desired to be limited by theory, it is believed that the formation of the colloidal dispersions of chalcogenide results from the steric stabilization of the particles generated in the presence of the polymer and solvent.

The following examples specifically defining preferred embodiments of the present invention are now provided, which examples are not intended to limit the scope of the present invention, it being noted that various alternative parameters which are not specifically mentioned are included within the scope of the present invention. Parts and percentages are by weight unless otherwise indicated.

EXAMPLE I

This example illustrates the formation of stable colloidal dispersions of selenium tellurium alloy particles with an average diameter of 0.3 micron.

Initially, the solvent Cellosolve ®, 100 milliliters, was charged into a 500 milliliter, three-necked round bottom flask equipped with a Teflon paddle stirrer, a gas inlet tube, and a graduated addition funnel. Thereafter, there was added 10 grams of epoxy resin; and a clear solution resulted subsequent to stirring the mixture at room temperature for 4 hours. Subsequently, there was added to the resulting mixture a solution of 8.5 grams, 0.046 moles of diethyl selenite, and 2.5 grams, 0.01 moles of tetraethoxy tellurane in 100 milliliters of Cellosolve ®. Stirring was then continued for 5 minutes, and the hydrazine, 5 milliliters, in 70 milliliters of Cellosolve ®, was added dropwise to the solution mixture. A dark colored dispersion, consisting of 4.8 grams of a selenium tellurium alloy, 10 grams of epoxy polymer, and 270 milliliters of Cellosolve ® was observed on completion of the addition of the hydrazine solution, which consumed a period of about one hour. Transmission electron microscopic analysis of the dispersion indicated that the selenium tellurium alloy particles were of an average diameter of 0.3 micron.

EXAMPLE II

The procedure of Example I was repeated with the exception that there was selected, in place of the epoxy resin, a phenoxy resin; and there resulted, as determined by transmission electron microscopy, a colloidal dispersion with selenium tellurium alloy particles with an average diameter of about 0.3 microns.

EXAMPLE III

Initially 100 milliliters of ethylene glycol was charged into a 500 milliliter, three-necked round bottom flask equipped with a Teflon paddle stirrer, a gas inlet tube, and a graduated addition funnel. Subsequently, 2.5 grams, 34.9 milliequivalents, of poly(acrylic acid) with a molecular weight of 250,000 was added to the flask; and purging with argon was accomplished while the reaction mixture was being stirred gently. Upon formation of a clear solution there was added thereto 0.82 grams, 26 milliequivalents, of hydrazine followed by stirring for 30 minutes. Thereafter, a solution of 3.85 grams, 20.8 milliequivalents, of diethyl selenite, 1.3 grams, 5.2 milliequivalents, of tetraethoxy tellurane; and 100 milliliters of ethylene glycol, were added dropwise at ambient temperature over a period of one hour. There resulted a black and stable alloy colloidal dispersion containing 2.5 grams of polyacrylic acid, selenium tellurium alloy particles, 2.25 grams, and ethylene gylcol, 200 milliliters, with the particle size of the alloy being from about 2,200 Angstroms (0.22 micron) to about 3,600 Angstroms (0.36 micron) as determined by transmission electron microscopy.

There can also be prepared in accordance with the process of the present invention colloidal dispersions of selenium, and dispersions of tellurium with particles of a diameter, for example, of from about 0.1 micron to about 0.6 micron.

Other modifications of the present invention will occur to those skilled in the art based upon a reading of the disclosure of the present application and these modifications are intended to be included within the scope of the present invention.

What is claimed is:

1. An improved process for the preparation of a stable colloidal dispersion of a selenium tellurium alloy, which comprises providing a solution with a polymer therein; adding to the solution a selenium ester and a tellurium ester; and subsequently subjecting the resulting mixture to a reduction reaction by adding thereto a reducing agent whereby there is generated selenium tellurium particles of a diamater of from about 0.01 microns to about 0.3 microns in solution.

2. A process in accordance with claim 1 wherein the polymer is selected from the group consisting of a vinyl resin, a polyurethane, a polyester, an epoxy, and a polyhydroxyether composition.

3. A process in accordance with claim 1 wherein the solution solvent is selected from the group consisting of Cellosolve ®, benzene, toluene, ethanol and methanol.

4. A process in accordance with claim 1 wherein the selenium ester is diethyl selenite, and the tellurium ester is tetraethoxy tellurane.

5. A process in accordance with claim 1 wherein the reducing agent added to the solution is hydrazine or sulfur dioxide.

6. A process in accordance with claim 1 wherein the selenium tellurium alloy comprises from about 1 percent to about 99 percent by weight of selenium, and from about 99 percent to about 1 percent by weight of tellurium.

7. A process in accordance with claim 1 wherein the polymer is present in the solution in an amount of from about 1 part by weight to about 40 parts by weight.

8. A process in accordance with claim 1 wherein the dispersion contains from about 1 percent by weight to about 30 percent by weight of particles of a selenium tellurium alloy.

9. A process in accordance with claim 1 wherein the reduction is accomplished at a temperature of from about 25° C. to about 100° C.

* * * * *